UNITED STATES PATENT OFFICE.

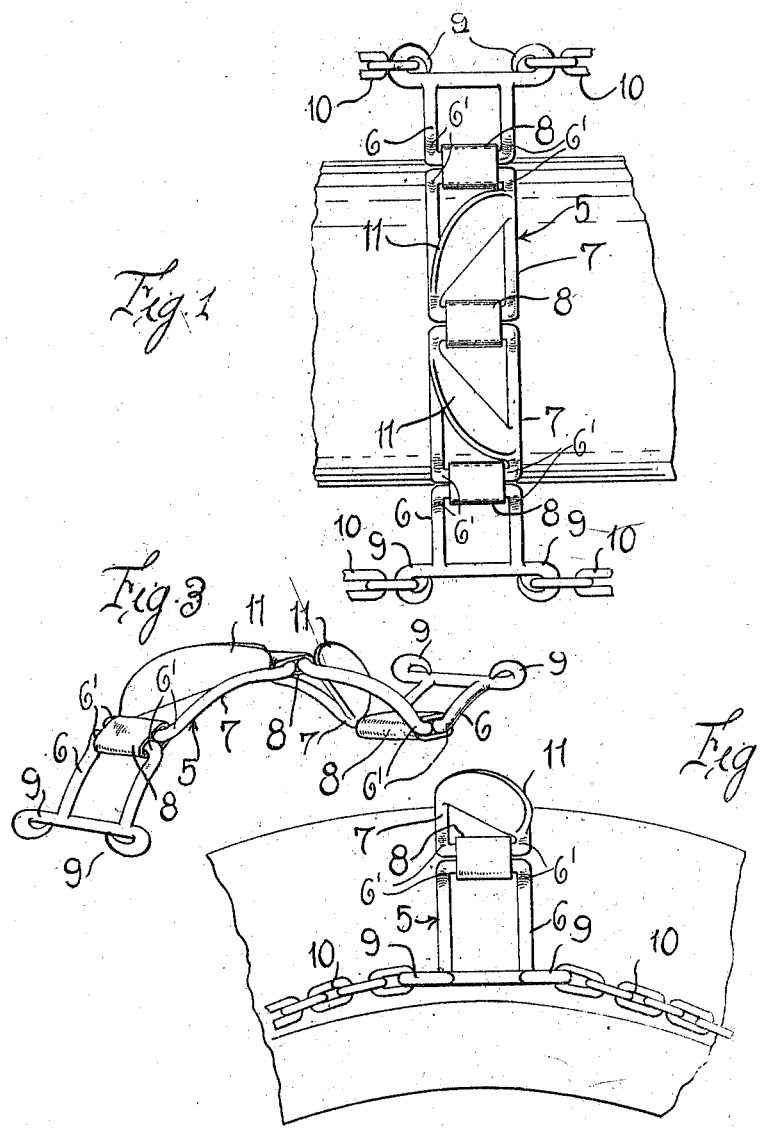

SETH G. WEED, OF COOKSVILLE, ILLINOIS.

ANTISKIDDING DEVICE FOR WHEEL-TIRES.

1,291,309.

Specification of Letters Patent.

Patented Jan. 14, 1919.

Application filed January 15, 1917. Serial No. 142,483.

*To all whom it may concern:*

Be it known that I, SETH G. WEED, a citizen of the United States, residing at Cooksville, in the county of McLean and State of Illinois, have invented certain new and useful Improvements in Antiskidding Devices for Wheel-Tires, of which the following is a specification, reference being had to the accompanying drawings.

This invention relates to an improved anti-skidding device for wheel tires, and has for its primary object to provide an article of this character of the chain type provided with means upon the transverse or cross chains, whereby the wheel will exert the requisite tractive effort and lateral or sidewise skidding of the wheel will also be effectively prevented.

It is another and more particular object of the invention to provide a chain armor for vehicle tires including spaced, transverse tread chains, and anti-skidding lugs arranged upon each of the chains and disposed in convergent relation toward the center of the peripheral face of the tire, whereby said lugs will engage the road surface in such manner as to prevent slipping or skidding of the wheel.

It is another object of my invention to provide an antiskidding chain armor for wheel tires wherein the transverse tread chains each consists of a series of rectangular, open links flexibly connected to each other, and anti-skidding lugs formed upon the inner adjacent links and preventing contact of the flexible connection between the links with the road surface.

It is also another object of my invention to provide a tread chain of such construction that sand or gravel will not be retained between the chain links and the tread surface of the tire, and to further provide separate chain connections between the ends of the tread chains at each side of the wheel.

With the above and other objects in view, my invention consists in the novel features of construction, combination, and arrangement of parts to be hereinafter more fully described, claimed and illustrated in the accompanying drawing, in which, Figure 1 is a fragmentary plan view of my improved anti-skidding tire armor applied to a wheel;

Fig. 2 is a fragmentary side elevation of the wheel; and

Fig. 3 is an enlarged perspective view of one of the tread chains.

Referring in detail to the drawing, 5 designates a series of transverse tread chains which extend over the periphery and upon opposite sides of the tire casing. Each of these chains consists of end links 6 and a pair of intermediate links 7. These links are longitudinally curved to conform to the curvature of the wheel tire and they are connected to each other by the metal sleeves or loops 8. The tread chain links are of open construction or, in other words, each link consists of a single metal rod or bar bent or cast in rectangular form. Upon the free ends of the links 6, hooks 9 are formed and project laterally from the link in relatively opposite directions. The opposed ends of the links 6 and 7 are slightly bent or curved outwardly, as at 6', so that the inner sides of the loops 8 connecting the links, will be disposed in the same plane with the inner surfaces of the link bars, thus permitting the longitudinal bars of the links to closely contact throughout their length with the periphery of the tire. To these hooks 9 the terminal links of the side chain sections 10 are connected.

Upon the intermediate links 7 of each tread chain, the diagonally disposed, antiskidding plates or lugs 11 are formed. These plates are disposed on relatively opposite, oblique lines and converge toward the central line of the periphery of the tire. The plates, at their converging or adjacent ends, are relatively narrow, and gradually increase in width toward their opposite ends and then again rapidly decrease in width, as clearly shown in Fig. 3 of the drawings. It will be observed that the plates are of such width as to prevent frictional engagement of the central link connecting sleeve 8 with the road surface, thus preventing wear upon said sleeve and possible breakage thereof.

In applying the anti-skidding armor to the wheel tire, the transverse tread chains are disposed across the tire with the narrower ends of the lugs or plates 11 extending forwardly or in the direction of rotation of the wheel, so that they will first engage the ground surface. In the travel of the vehicle over muddy or sandy stretches of road, these converging plates or lugs will afford the necessary tractive purchase for the wheel, so that the wheel will not idly revolve, thereby stalling the machine. When the wheel is upon a wet or icy road surface, the narrow ends of the plates 11 will engage and grip into the road surface, so that any tendency of the wheel to skid or slip laterally will tend to shift the lug on the side of the tread chain corresponding to the direction of movement of the wheel, and present its ground engaging edge at right angles to the line of movement of the wheel. The side chain connections between the terminal links of the tread chains afford sufficient flexibility to permit of such shifting or turning movement of the tread chain links. In this manner, the continued sliding or skidding of the wheel is abruptly stopped.

By constructing the tread chains with the wide open links, sand and gravel collecting between the link bars will be readily dislodged and quickly sift between the bars of the links and the periphery of the tire, thus obviating undue wear upon the latter. The connection of the lugs or plates to the link bars is integrally formed in the casting of the links. Thus, a very strong and durable construction is obtained.

From the foregoing description, taken in connection with the accompanying drawing, it will be seen that I have devised a very simple and effective anti-skidding device for wheel tires. The armor may be very easily and quickly applied to the tire or removed therefrom. The tread chains carrying the converging lugs are preferably arranged about seven or eight inches apart, but it will be understood that a greater or less number of these tread chains can be provided as desired. The device is also susceptible of many other modifications in the form, proportion and arrangement of its several detail parts and I, therefore, reserve the privilege of resorting to all such legitimate changes as may be fairly embodied within the spirit and scope of the invention as claimed.

Having thus fully described my invention, what I desire to claim and secure by Letters Patent is:

1. A tread grip for wheel tires consisting of flexibly connected, open centered links, each of said links having an obliquely disposed road engaging lug integrally formed at its ends with the respective side portions of the link, the lugs on the adjacent links converging toward the center of the tire tread in the direction of forward rotation of the wheel.

2. As an improved article of manufacture, an open centered one piece tread member for wheel tires having an obliquely disposed road engaging traction lug bridging the open center of said member and integrally connecting opposite portions thereof.

3. As an improved article of manufacture, an open centered one piece tread link for wheel tires of elongated rectangular form and having a longitudinal tapering road engaging traction lug integrally connected at its ends to the opposite side portions of the link.

4. A tread chain for wheel tires consisting of a plurality of longitudinally curved links having spaced side bars, the ends of the links at their juncture with the side bars being bent or curved outwardly, and metal loops flexibly connecting the outwardly turned ends of the links and having their inner faces disposed in the same plane as the inner concave faces of the link bars, whereby the latter will closely engage upon the periphery of the wheel tire throughout their length.

In testimony whereof I hereunto affix my signature in the presence of two witnesses.

SETH G. WEED.

Witnesses:
 LEAH WEED,
 JUDSON SWALLOW.